(12) United States Patent
Ito

(10) Patent No.: US 9,716,824 B2
(45) Date of Patent: Jul. 25, 2017

(54) FOCUS DETECTION APPARATUS AND FOCUS DETECTION METHOD

(71) Applicant: Olympus Corporation, Hachioji-shi, Tokyo (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/174,588

(22) Filed: Jun. 6, 2016

(65) Prior Publication Data

US 2016/0373642 A1  Dec. 22, 2016

(30) Foreign Application Priority Data

Jun. 19, 2015  (JP) ................. 2015-124017

(51) Int. Cl.
| | |
|---|---|
| H04N 5/232 | (2006.01) |
| H04N 5/235 | (2006.01) |
| G03B 13/36 | (2006.01) |
| G02B 7/36 | (2006.01) |

(52) U.S. Cl.
CPC .......... *H04N 5/23212* (2013.01); *G02B 7/36* (2013.01); *G03B 13/36* (2013.01); *H04N 5/2351* (2013.01)

(58) Field of Classification Search
CPC ............ H04N 5/23212; H04N 5/2351; H04N 5/23293; H04N 5/2353; H04N 5/2355; H04N 5/235; G03B 13/36; G03B 13/32; G02B 7/36; G06K 9/4647
See application file for complete search history.

(56) References Cited

U.S. PATENT DOCUMENTS

| | | | | |
|---|---|---|---|---|
| 6,700,618 B1 * | 3/2004 | Chubachi | ........... | H04N 5/23212 348/345 |
| 7,729,604 B2 * | 6/2010 | Wen | .......... | G02B 7/36 250/201.7 |
| 7,876,375 B2 * | 1/2011 | Takei | ................. | H04N 5/23212 348/345 |
| 7,957,633 B2 * | 6/2011 | Uehara | .................... | G02B 7/36 348/349 |
| 8,395,695 B2 * | 3/2013 | Uehara | .............. | H04N 5/23219 348/222.1 |
| 8,786,762 B2 | 7/2014 | Ito | | |
| 9,413,946 B2 * | 8/2016 | Hamano | ............ | H04N 5/23212 |
| 9,444,992 B2 * | 9/2016 | Umezawa | .......... | H04N 5/23212 |
| 9,488,898 B2 * | 11/2016 | Inoue | ...................... | G02B 7/36 |
| 9,578,232 B2 * | 2/2017 | Hamano | ............ | H04N 5/23212 |

(Continued)

*Primary Examiner* — Michael Osinski
(74) *Attorney, Agent, or Firm* — John C. Pokotylo; Straub & Pokotylo

(57) ABSTRACT

A focus detection apparatus according the present invention includes: a normal focus detection information acquiring section which detects a normal AF evaluation peak position from contrast information; a special focus detection information acquiring section which detects a special AF evaluation peak position among different focus positions using brightness information and the contrast information; a determination section which determines information to be used for focus detection using the brightness information and either of the normal AF evaluation peak position and the special AF evaluation peak position, and a focus detection calculation section which calculates a focus detection position using the information to be used for focus detection determined by the determination section.

8 Claims, 10 Drawing Sheets

(56) References Cited

U.S. PATENT DOCUMENTS

| | | | |
|---|---|---|---|
| 2004/0061800 A1* | 4/2004 | Yamazaki | H04N 5/23212 348/349 |
| 2008/0240700 A1* | 10/2008 | Takagi | G03B 13/32 396/98 |
| 2009/0016709 A1* | 1/2009 | Wen | G02B 7/36 396/127 |
| 2009/0190023 A1* | 7/2009 | Mise | G03B 13/00 348/345 |
| 2010/0067890 A1* | 3/2010 | Ogino | G02B 7/282 396/104 |
| 2010/0209094 A1* | 8/2010 | Uehara | G02B 27/28 396/125 |
| 2011/0157425 A1* | 6/2011 | Nakayama | H04N 5/23245 348/234 |
| 2011/0221952 A1* | 9/2011 | Hamada | H04N 5/23209 348/345 |
| 2012/0062785 A1* | 3/2012 | Sugimoto | H04N 5/2351 348/345 |
| 2012/0154666 A1* | 6/2012 | Ohashi | H04N 5/23293 348/345 |
| 2013/0016277 A1* | 1/2013 | Ito | G02B 7/36 348/353 |
| 2013/0201386 A1* | 8/2013 | Ohbuchi | H04N 5/23212 348/349 |
| 2013/0300895 A1* | 11/2013 | Kawarada | H04N 5/23212 348/229.1 |
| 2014/0176783 A1* | 6/2014 | Shibagami | H04N 5/23212 348/349 |
| 2014/0313398 A1* | 10/2014 | Hamano | H04N 5/23212 348/354 |
| 2015/0009352 A1* | 1/2015 | Shibagami | H04N 5/2355 348/218.1 |
| 2015/0189155 A1* | 7/2015 | Umezawa | H04N 5/23212 348/345 |
| 2015/0207984 A1* | 7/2015 | Hamano | H04N 5/23212 348/349 |
| 2015/0316833 A1* | 11/2015 | Watanabe | G02B 7/28 348/345 |
| 2015/0350527 A1* | 12/2015 | Hamano | H04N 5/23212 348/231.99 |
| 2016/0080634 A1* | 3/2016 | Hamano | G02B 7/365 348/349 |
| 2016/0173760 A1* | 6/2016 | Kudo | H04N 5/23212 348/353 |
| 2016/0366329 A1* | 12/2016 | Sasaki | H04N 5/3656 |

* cited by examiner

AF PROCESSING IMAGE (NON-LIGHT-EMISSION SUBJECT) IN BRIGHT STATE

AF PROCESSING IMAGE (NON-LIGHT-EMISSION SUBJECT) IN DARK STATE

AF PROCESSING IMAGE (NON-LIGHT-EMISSION SUBJECT)
WHEN AF AUXILIARY LIGHT IS EMITTED IN DARK STATE

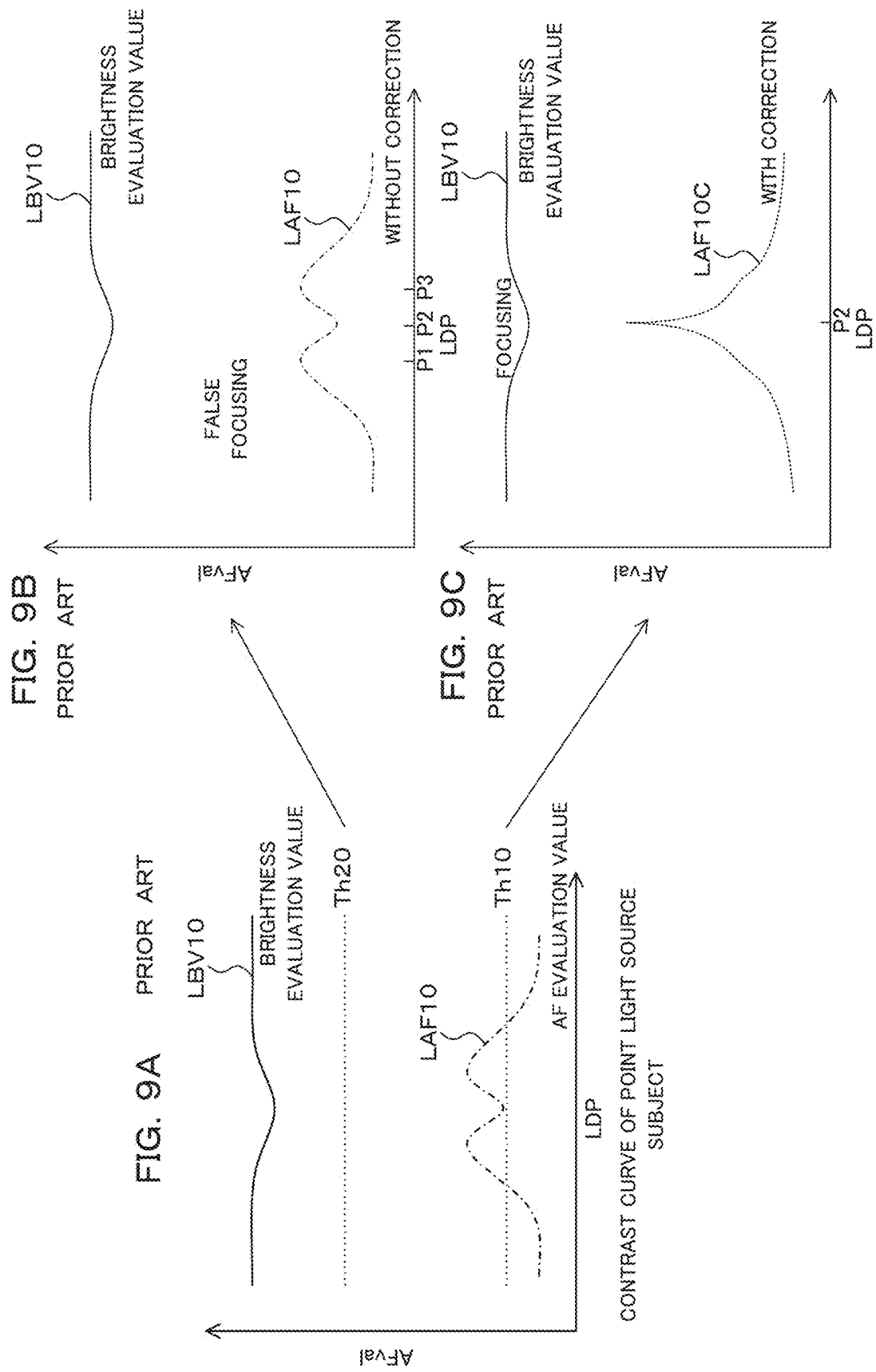

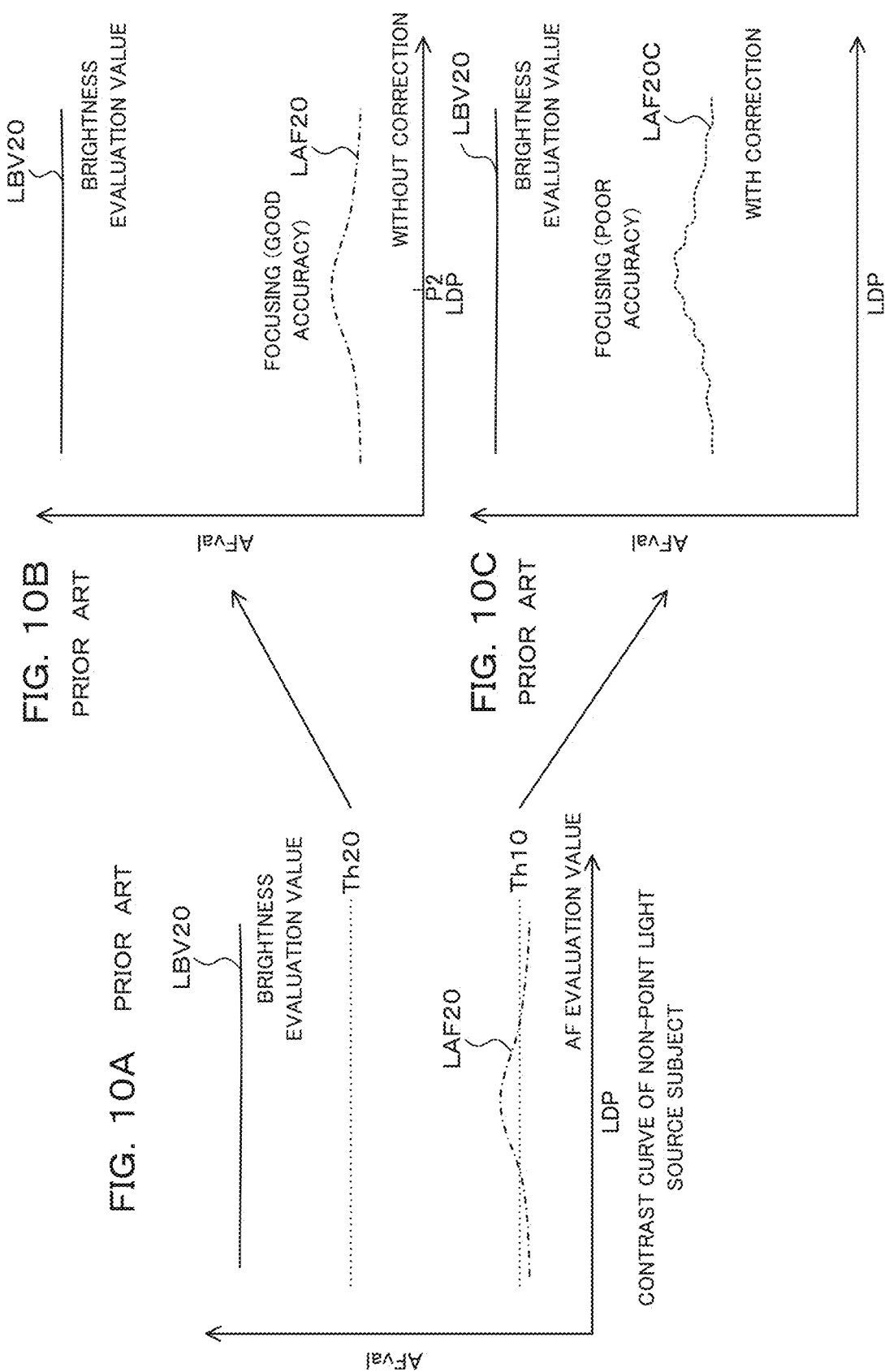

FOCUS DETECTION APPARATUS AND FOCUS DETECTION METHOD

CROSS-REFERENCE TO RELATED APPLICATIONS

Benefit is claimed, under 35 U.S.C. §119, to the filing date of prior Japanese Patent Application No. 2015-124017 filed on Jun. 19, 2015. This application is expressly incorporated herein by reference. The scope of the present invention is not limited to any requirements of the specific embodiments described in the application.

BACKGROUND OF THE INVENTION

1. Field of the Invention

The present invention relates to a focus detection apparatus and a focus detection method capable of performing focus detection accurately even on a subject such as a point light source in the photographing of a night scene.

2. Description of Related Art

Conventionally there has been used a contrast AF method as an automatic focus detection method of a photographing lens provided for an imaging device. This contrast AF method calculates a contrast value of a subject image formed by the photographing lens, and controls the position of the photographing lens so as to cause this contrast value to have a peak value.

In this contrast AF method, however, it is difficult to perform focus detection accurately on a subject such as a point light source in the photographing of a night scene. Accordingly, there is proposed a method that, when a brightness evaluation value is compared with the threshold value and the brightness evaluation value is larger than the threshold value, the contrast value is corrected by the brightness evaluation value and the focus detection is performed using this corrected contrast value (refer to Japanese Patent Laid-Open Publication No. 2011-175119 (in the following, called "Patent Literature 1")).

According to a focus detection apparatus disclosed in Patent Literature 1, it is possible to detect a focusing position accurately for the point light source in the photographing of a night scene or the like. It is difficult, however, to detect a focusing position accurately for a subject which is not a point light source and has a low brightness. This point will be explained by the use of FIGS. 9A to 10C.

FIGS. 9A to 9C show AF evaluation values and brightness evaluation values detected using image data acquired while a focus lens is being moved (during lens scan) when the subject is a point light source. In the graph shown in FIG. 9A, the horizontal axis indicates a focus lens position (LDP) and the vertical axis indicates an AF evaluation value (AFval) and a brightness evaluation value. That is, the brightness evaluation value curve LBV10 indicates a change in the brightness evaluation value acquired while the focus lens is being moved, and the AF evaluation value curve LAF10 indicates a change in the AF evaluation value acquired while the focus lens is being moved.

When the peak value of the AF evaluation value curve LAF10 is smaller than the threshold value Th20, correction is not performed on the AF evaluation value as shown in the graph of FIG. 9B. In this case, a true focusing position is the position P2. As shown in the graph of FIG. 9B, however, since the AF evaluation value has peak values at two positions P1 and P3 and the focus detection is performed using these false focusing positions, it is not possible to detect a focusing position accurately.

On the other hand, when the peak value of the AF evaluation value LAF10 is larger than the threshold value Th10, correction is performed on the AF evaluation value as shown in the graph of FIG. 9C. In this case, as shown in the graph of FIG. 9C, the AF evaluation value has the peak value at the position P2 by performing the correction and it is possible to detect an accurate focusing position.

In this manner, when the subject is a point light source subject, the imaging device disclosed in Patent Literature 1 can prevent false focusing and detect a focusing position accurately by the correction of the AF evaluation value. Here, the threshold values Th10 and Th20 are originally the same value and the AF evaluation value varies. In FIGS. 9A to 9C, however, the AF evaluation values are fixed and the threshold values are made different from each other, for convenience in illustration. Illustration is performed in the same manner also in FIGS. 10A to 10C to be described below.

FIGS. 10A to 10C show the AF evaluation value and the brightness evaluation value when the subject is not a point light source. In the graph shown in FIG. 10A also, the horizontal axis indicates a focus lens position (LDP) and the vertical axis indicates an AF evaluation value (AFval) and a brightness evaluation value. That is, the brightness evaluation value curve LBV20 indicates a change in the brightness evaluation value acquired while the focus lens is being moved, and the AF evaluation value curve LAF20 indicates a change in the AF evaluation value acquired while the focus lens is being moved.

When the peak value of the AF evaluation value curve LAF20 is smaller than the threshold value Th20, correction is not performed on the AF evaluation value as shown in the graph of FIG. 10B. In this case, as shown in the graph of FIG. 10B, the AF evaluation value has the peak value at the position P2 and it is possible to detect an accurate focusing position without performing the correction.

On the other hand, when the peak value of the AF evaluation value curve LAF20 is larger than the threshold value Th10, correction is performed on the AF evaluation value as shown in the graph of FIG. 10C. In this case, the corrected AF evaluation value curve LAF20C becomes a curve which varies irregularly due to noise influence by performing the correction and it is difficult to detect a peak value and it is not possible to detect the focusing position accurately, as shown in the graph of FIG. 10C.

In this manner, in the imaging device disclosed in Patent Literature 1, the correction of the AF evaluation value, while can detect a focusing position accurately for an point light source subject, cannot detect a focusing position accurately for a non-point light source subject.

SUMMARY OF THE INVENTION

The present invention aims to provide a focus detection apparatus and a focus detection method capable of performing focusing to an appropriate focusing position without depending on whether a subject is a point light source or a non-point light source.

A focus detection apparatus according to a first aspect of the present invention comprising: an imaging section which acquires image data; a brightness information acquiring section which acquires brightness information at different focus positions and detects a peak position of a brightness evaluation value; a normal focus detection information acquiring section which calculates contrast information using the image data at different focus positions and detects a peak position of a normal AF evaluation value from this contrast information; a special focus detection information acquiring section which detects a peak position of special AF evaluation values among different focus positions using the brightness information acquired by the brightness information acquiring section and the contrast information calculated by the normal focus detection information acquiring section; a determination section which determines information to be used for focus detection using the brightness information and at least either of the peak position of the normal AF evaluation value detected by the normal focus detection information acquiring section and the peak position of the special AF evaluation value detected by the special focus detection information acquiring section; and a focus detection calculation section which calculates focus detection position using the information to be used for focus detection determined by the determination section.

A focus detection method according to a second aspect of the present invention comprising: acquiring image data; acquiring brightness information at different focus positions using the image data, detecting a peak position of a brightness evaluation value; calculating contrast information using the image data at different focus positions, detecting a peak position of a normal AF evaluation value from this contrast information; detecting a peak position of a special AF evaluation value at different focus positions using the brightness information and the contrast information; determining information to be used for focus detection using the brightness information and at least either of the peak position of the normal AF evaluation value and the peak position of the special AF evaluation value; and calculating a focus detection position using the determined information to be used for focus detection.

BRIEF DESCRIPTION OF THE DRAWINGS

FIGS. 9A to 9C are graphs explaining a focus detection operation in a focus detection apparatus in which a conventional point light source measure is provided.

FIGS. 10A to 10C are graphs explaining a focus detection operation in a focus detection apparatus in which a conventional point light source measure is provided.

DETAILED DESCRIPTION OF THE PREFERRED EMBODIMENTS

Hereinafter, there will be explained an example in which the present invention is applied to a digital camera as one embodiment. This digital camera includes an imaging section which converts a subject image into image data, and performs live-view display of the subject image using this converted image data on a display section disposed on the rear face of a main body. A photographer observes the live-view display and thereby determines a composition and shutter timing. Image data of a still image is recorded into a recording medium in release operation, and image data of a moving image is recorded into the recording medium in the operation of a moving image button. The image data recorded in the recoding medium can be reproduced and displayed on the display section when a reproduction mode is selected.

Further, contrast information is calculated using the image data, the peak position of a normal AF evaluation value is detected from this contrast information, and the peak position of a point light source AF evaluation value is detected from brightness information and the contrast information. Then, a focus position is obtained by the use of either of these detected peak position of the normal AF evaluation value and peak position of the point light source AF evaluation value, and a focus lens is driven to a focusing position. Note that, while the peak value indicates an extreme value on the convex side of the evaluation values in the present embodiment, the peak value may be an extreme value on the concave side and the peak position may be the position of the extreme value on the concave side.

Figure 1:
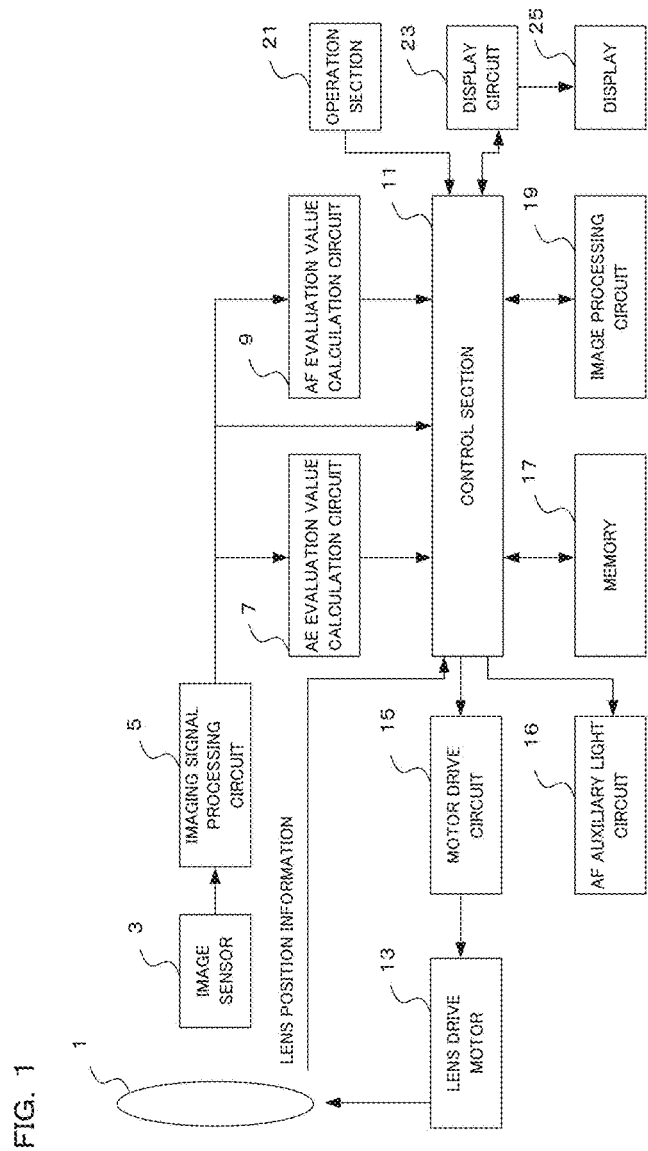
FIG. 1 is a block diagram mainly showing an electrical structure of a camera according to an embodiment of the present invention.

FIG. 1 is a block diagram mainly showing an electrical structure of a camera according to the present embodiment. An image sensor 3 is disposed on the optical axis of a photographing lens 1 in this camera. The output of the image sensor 3 is connected to an imaging signal processing circuit 5, and the output of the imaging signal processing circuit 5 is connected to an AE evaluation value calculation circuit 7, an AF evaluation value calculation circuit 9, and a control section 11. Further, the control section 11 is connected with a motor drive circuit 15, a memory 17, an image processing circuit 19, an operation section 21, and a display circuit 23. The motor drive circuit 15 is connected with a lens drive motor 13, and the lens drive motor 13 changes the position of the photographing lens 1.

The photographing lens 1 is an optical system including a focus lens for condensing a subject light flux onto the image sensor 3 to form a subject image. This photographing lens 1 is moved in the optical axis direction by the lens drive motor 13 controlled by the motor drive circuit 15 which is operated in response to an instruction from the control section 11, and thereby the focus state is changed. The position of the focus lens is detected by a lens position detection section (not illustrated) and output to the control section 11 as lens position information.

The image sensor 3 includes color filters of a Bayer array disposed on the front face and photoelectric conversion elements such as photodiodes arranged corresponding to these color filters. Each pixel is configured with each of the color filters and each of the photoelectric conversion elements corresponding thereto, and an imaging region is configured with a pixel group. The image sensor 3 is a CCD image sensor, a CMOS image sensor, or the like, and receives light condensed by the photographing lens 1 in each pixel, converts the light into optical current, accumulates this optical current in a capacitor (floating diffusion), and outputs the accumulated optical current to the imaging signal processing circuit 5 as an analog voltage signal (image signal).

The imaging signal processing circuit 5 amplifies the image signal output from the image sensor 3, and performs signal processing such as analog-digital (AD) conversion and the like. The image sensor 3 and the imaging signal processing circuit 5 function as an imaging section to acquire image data.

The AE evaluation value calculation circuit 7 connected to the imaging signal processing circuit 5 calculates a brightness evaluation value (AE evaluation value) using the image data output from the imaging signal processing circuit 5. This brightness evaluation value is an integrated value, an average value, or the like of brightness values calculated using the image data of approximately the same region as a detection region for focus detection by the contrast AF. Further, the AE evaluation value calculation circuit 7, while moving the focus lens of the photographing lens 1 by the lens drive motor 13, acquires the brightness evaluation value at each position.

The AF evaluation value calculation circuit 9 inputs the image data of a preliminarily determined detection region for focus detection, and calculates a value corresponding to the contrast of an image of this region (AF evaluation value). In the contrast calculation, a high frequency component may be extracted from the image data, and thus the calculation is performed by the use of a digital high-pass filter or the like. The AF evaluation value calculation circuit 9 calculates each of a point light source AF evaluation value and a normal AF evaluation value, as will be described by the use of FIG. 2.

Note that the AE evaluation value calculation circuit 7 and the AF evaluation value calculation circuit 9 obviously may be realized by software to execute an equivalent function in the control section 11, other than a hardware circuit as shown in the present embodiment.

The control section 11 includes a CPU (Central Processing Unit), a peripheral circuit formed by an ASIC (Application Specific Integrated Circuit) or the like, an electrically rewritable non-volatile memory, and a volatile memory. The control section 11 integrally controls various kinds of sequence of the entire camera according to a program stored in the non-volatile memory. Further, the control section 11 inputs information from the AE evaluation value calculation circuit 7, the AF evaluation value calculation circuit 9 and the like, and performs focusing control of the photographing lens 1 by controlling the motor drive circuit 15 and the lens drive motor 13. Further, an AF auxiliary light circuit 16 emits light in response to an instruction from the control section 11 as ranging assistance for a dark subject.

The image processing circuit 19 connected to the control section 11 performs image processing such as white balance correction processing, synchronization processing, and color conversion processing on the image data output from the imaging signal processing circuit 5. Further, the image processing circuit 19 performs face detection whether or not a face part of a person exists in a screen using the image data. Further, the image processing circuit 19 performs image processing for the live-view display when a live-view is displayed on a display 25, performs image compression when the image is recorded into the memory 17, and performs decompression of the compressed image data read out from the memory 17.

The operation section 21 connected to the control section 11 includes operation members such as a power supply button, a release button, and various kinds of input key. When a user operates any of the operation members in the operation section 21, the control section 11 executes various kinds of sequence corresponding to the user operations. The release button in the operation section 21 has two stage switches of a first release switch and a second release switch. When the release button is half-pressed, the first release switch is turned on, and when the release button is further pressed into a fully pressed state from the half-pressed state, the second release switch is turned on. When the first release switch is turned on, the control section 11 executes a photographing preparation sequence such as AE processing and AF processing. Further, when the second release switch is turned on, the control section 11 executes a photographing sequence to perform photographing.

The memory 17 connected to the control section 11 is a storage medium detachable from the camera main body, for example, and records the image data compressed in the image processing circuit 19 and accompanying data. Note that a recording medium built in the camera main body such as a hard disk may be used as the recording medium for recording image data and the like, not limited to the external memory detachable from the camera main body.

The display circuit 23 is connected to the display 25, and the display 25 includes a liquid crystal display (LCD) or the like provided on the rear face or the like of the camera main body and an electronic view finder or the like built in the camera main body for enabling observation through an eyepiece. The display 25 displays a live-view image of a subject image using image data from the image sensor 3 and the imaging signal processing circuit 5, and reads out image data recorded in the memory 17, performs reproduction display, and performs the display of a menu screen or the like. The display circuit 23 performs display on the display 25.

Figure 2:
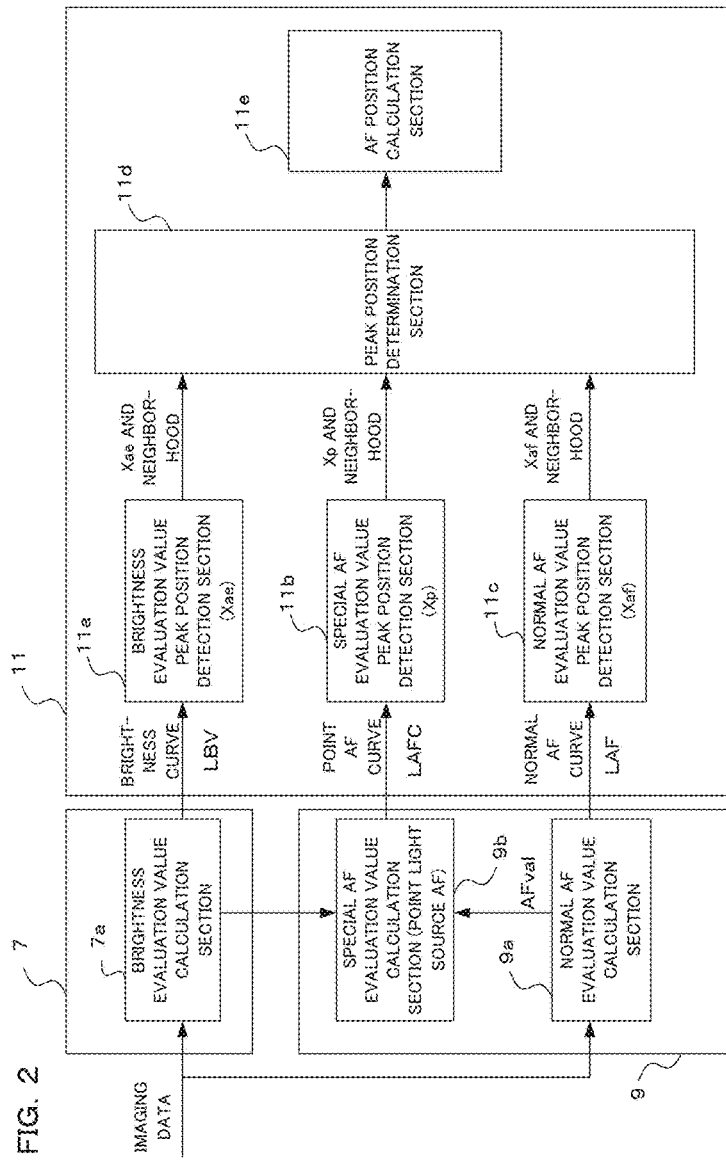
FIG. 2 is a block diagram showing functions in a peripheral part of a control section in a camera according to an embodiment of the present invention.

Next, by the use of FIG. 2, functions for focus detection in the AE evaluation value calculation circuit 7, the AF evaluation value calculation circuit 9, and the control section 11 will be explained.

A brightness evaluation value calculation section 7a is included in the AE evaluation value calculation circuit 7, and inputs the image data from the imaging signal processing circuit 5 and calculates a brightness evaluation value. The brightness evaluation value is calculated every time the focus lens of the photographing lens 1 is moved in a predetermined amount by lens scan drive (in other words, every time image data of one frame is output). This calculated brightness evaluation value is output to a special AF evaluation value calculation section 9b, and output also to a brightness evaluation value peak position detection section 11a in the control section 11 as a brightness evaluation value curve (brightness curve) LBV. Here, this brightness evaluation value curve corresponds to a brightness evaluation value curve LBV to be described below by the use of FIGS. 3A to 3C.

A normal AF evaluation value calculation section 9a is included in the AF evaluation value calculation circuit 9, and inputs the image data from the imaging signal processing circuit 5 and calculates a normal AF evaluation value. This normal AF evaluation value is a value indicating an image contrast of a detection region calculated by, for example, extracting a high frequency component of the image data in the detection region.

The normal AF evaluation value calculation section 9a calculates the normal AF evaluation value every time the focus lens of the photographing lens 1 is moved in the predetermined amount by the lens scan drive (in other words, every time the image data of one frame is output), and this calculated normal AF evaluation value is output to the special AF evaluation value calculation section 9b, and also output to a normal AF evaluation value peak position detection section 11c in the control section 11 as a normal AF curve LAF. This normal AF curve corresponds to a normal AF evaluation value curve LAF to be described below by the use of FIGS. 3A to 3C.

The special AF evaluation value calculation section 9b is included in the AF evaluation value calculation circuit 9, and inputs the brightness evaluation value from the brightness evaluation value calculation section 7a and inputs the normal AF evaluation value from the normal AF evaluation value calculation section 9a. Then, the special AF evaluation value calculation section 9b calculates a special AF evaluation value (specifically, point light source correction AF evaluation value) (refer to S21 in FIG. 5 to be described below). This special AF evaluation value is an evaluation value for detecting a focusing position of a point light source in the detection region using the brightness evaluation value and the normal AF evaluation value.

Figure 5:
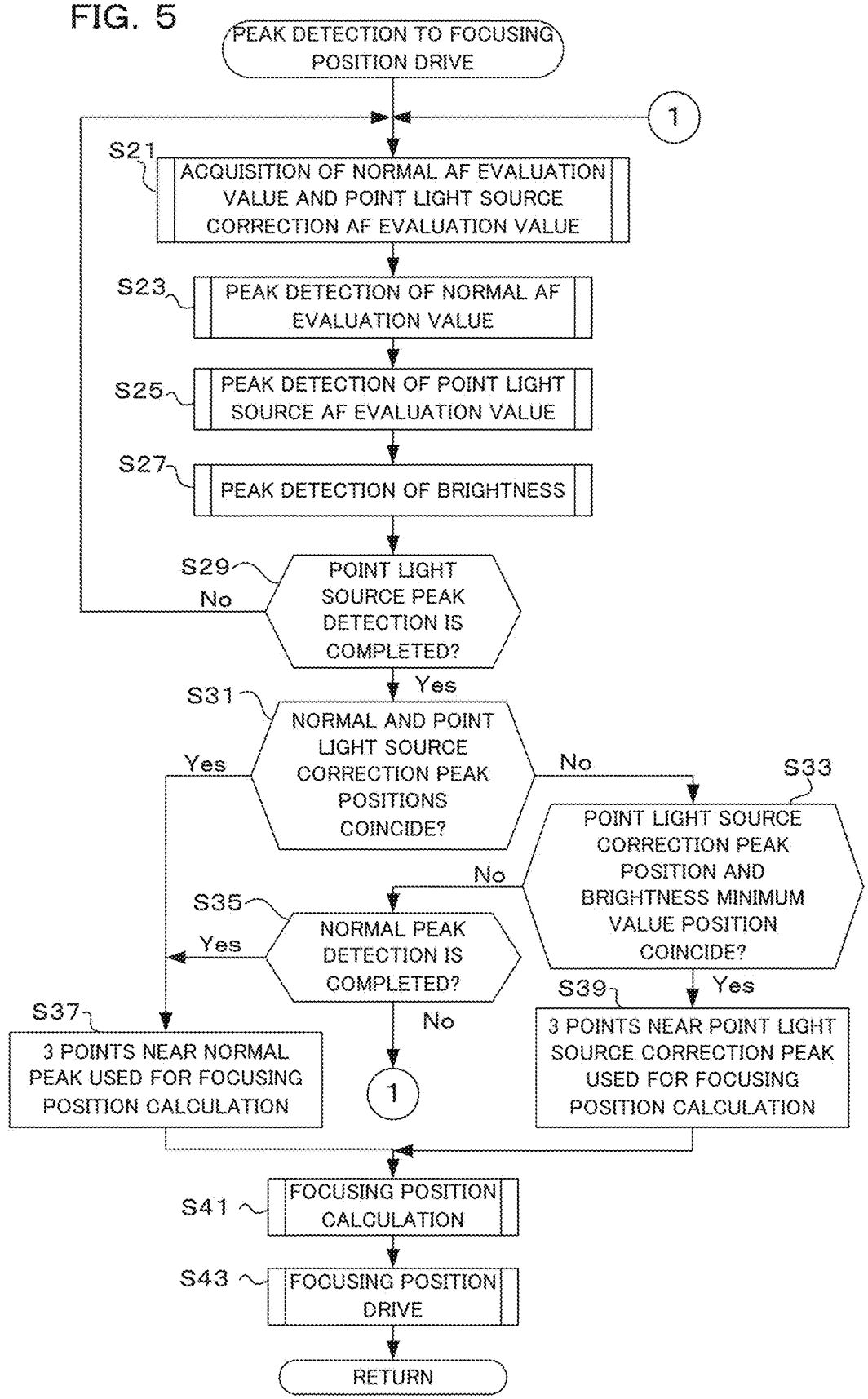
FIG. 5 is a flowchart showing an operation from peak detection to focusing position drive in a camera according to an embodiment of the present invention.

The special AF evaluation value calculation section 9b calculates the special AF evaluation value every time the focus lens of the photographing lens 1 is moved in the predetermined amount by the lens scan drive (in other words, every time the image data of one frame is output), and outputs the special AF evaluation value to a special AF evaluation value peak position detection section 11b in the control section 11 as a point light source correction AF evaluation value curve (point AF curve) LAFC (refer to S21 in FIG. 5 to be described below). This point AF curve corresponds to a point light source correction AF evaluation value curve LAFC to be described below by the use of FIGS. 3A to 3C.

The brightness evaluation value peak position detection section 11a is included in the control section 11, and inputs the brightness evaluation value (brightness curve) from the brightness evaluation value calculation section 7a, and detects the peak position (Xae) of the brightness evaluation value (refer to S27 in FIG. 5 to be described below). The brightness evaluation value calculation section 7a and the brightness evaluation value peak position detection section 11a acquire brightness information at different focus positions, and function as a brightness information acquiring section to detect the peak position of the brightness evaluation value. The above brightness information in this brightness information acquiring section corresponds to any one of a brightness value in a predetermined region, the number of saturated output regions, and presence or absence of a brightness difference exists in divided regions.

The special AF evaluation value peak position detection section 11b is included in the control section 11, and inputs the point light source correction AF evaluation value (point AF curve) from the special AF evaluation value calculation section 9b, and detects the special AF evaluation value peak position (Xp) (refer to S25 in FIG. 5 to be described below). The special AF evaluation value calculation section 9b and the special AF evaluation value peak position detection section 11b function as a special focus detection information acquiring section to detect a special AF evaluation value peak position at different focus positions using the brightness information acquired in the brightness information acquiring section and contrast information calculated in a normal focus detection information acquiring section.

The normal AF evaluation value peak position detection section 11c is included in the control section 11, and inputs the normal AF evaluation value (normal AF curve) from the normal AF evaluation value calculation section 9a and detects the normal AF evaluation value peak position (Xaf)) (refer to S23 in FIG. 5 to be described below). The normal AF evaluation value calculation section 9a and the normal AF evaluation value peak position detection section 11c function as the normal focus detection information acquiring section to calculate the contrast information using the image data at different focus positions and detect the normal AF evaluation value peak position from this contrast information.

A peak position determination section 11d inputs the brightness evaluation value peak position Xae and information therearound from the brightness evaluation value peak position detection section 11a, inputs the special AF evaluation value peak position Xp and information therearound from the special AF evaluation value peak position detection section 11b, and inputs the normal AF evaluation value peak position Xaf and information therearound from the normal AF evaluation value peak position detection section 11c. Then, the peak position determination section 11d compares the three peak positions (Xae, Xp, and Xaf) to determine which position is to be selected as an AF position (refer to S31 to S39 in FIG. 5 to be described below). This determined AF position is output to an AF position calculation section 11e.

The determination performed in the peak position determination section 11d will be described below by the use of FIGS. 3A to 3C. The peak position determination section 11d functions as a determination section to determine information to be used for focus detection using the brightness information and at least either of the peak position of the normal AF evaluation value detected in the normal focus detection information acquiring section and the peak position of the special AF evaluation value detected in the special focus detection information acquiring section.

This peak position determination section 11d determines whether or not the peak position of the brightness information at different focus positions and the peak position of the normal AF evaluation value or the special AF evaluation value exist within a predetermined distance (refer to S31 and S33 in FIG. 5, for example). Further, the peak position determination section 11d determines whether or not the peak position of the special AF evaluation value and the peak position of the normal AF evaluation value or the peak position of the brightness evaluation value exist within a predetermined distance (refer to S31 and S33 in FIG. 5, for example).

The AF position calculation section 11e calculates the AF position using the peak position output from the peak position determination section 11d. The calculation of this AF position is performed by three point interpolation calculation or the like using the focus position and the AF evaluation value corresponding to the peak position and the focus positions and the AF evaluation values before and behind the peak position, for example. The AF position calculation section 11e functions as a focus detection calculation section to calculate the focus detection position using the information to be used for focus detection determined by the determination section. This focus detection calculation section selects the peak position of the special AF evaluation value peak position as a position to be used for focus detection calculation when the peak positions are determined to exist within the predetermined distance by the determination section, and uses the peak position of the normal AF evaluation value for the focus detection calculation when the peak positions are determined not to exist within the predetermined distance by the determination section (refer to S37 and S39 in FIG. 5, for example).

Next, the peak position determination performed in the peak position determination section 11d will be explained by the use of FIGS. 3A to 3C. In the graphs shown in FIGS. 3A to 3C, LBV indicates a brightness evaluation value curve (brightness curve) output from the brightness evaluation value calculation section 7a, LAF indicates a normal AF evaluation value curve (normal AF curve) output from the normal AF evaluation value calculation section 9a, and LAFC indicates a point light source correction AF evaluation value curve (point AF curve) output from the special AF evaluation value calculation section 9b. Further, the horizontal axis of the graph indicates an LDP (focus lens position) and the vertical axis indicates an AFval (AF evaluation value).

Figure 3A:
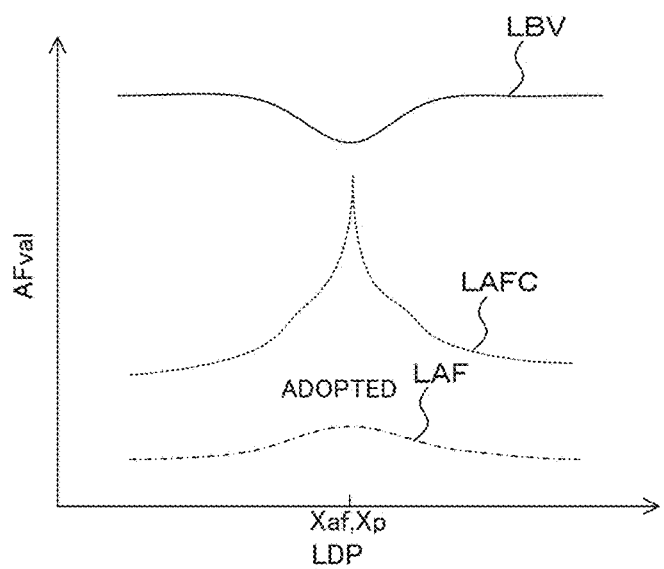
FIGS. 3A to 3C are graphs explaining a focus detection operation in a camera according to an embodiment of the present invention.

FIG. 3A shows a case where the peak position Xaf of the normal AF evaluation value curve LAF and the peak position Xp of the point light source correction AF evaluation value curve LAFC coincide with each other (assumed to coincide with each other if Xaf and Xp exist within a predetermined range). In this case, the peak position determination section 11d selects the peak position Xaf of the normal AF evaluation value curve for focus detection, and outputs this peak position Xaf to the AF position calculation section 11e.

Since the calculation of the focusing position in this case is performed by the interpolation calculation using the AF evaluation values at the peak position and before and behind the peak position, the AF evaluation values of three points are different even when the peak position Xp of the normal AF curve and the peak position of the point light source correction AF evaluation value curve coincide with each other. Further, each of the normal AF evaluation value curve and the point light source correction AF evaluation value curve is not calculated continuously, and the peak position is detected among the AF evaluation values calculated at discrete positions in the lens scan drive. Accordingly, even when the peak positions appear to coincide with each other, actual peak positions could be shifted from each other. Since the peak position Xaf detected from the normal AF evaluation value curve before correction has a higher accuracy, this peak position Xaf is selected in the present embodiment (refer to S31 Yes to S37 in FIG. 5 to be described below).

Figure 3B:
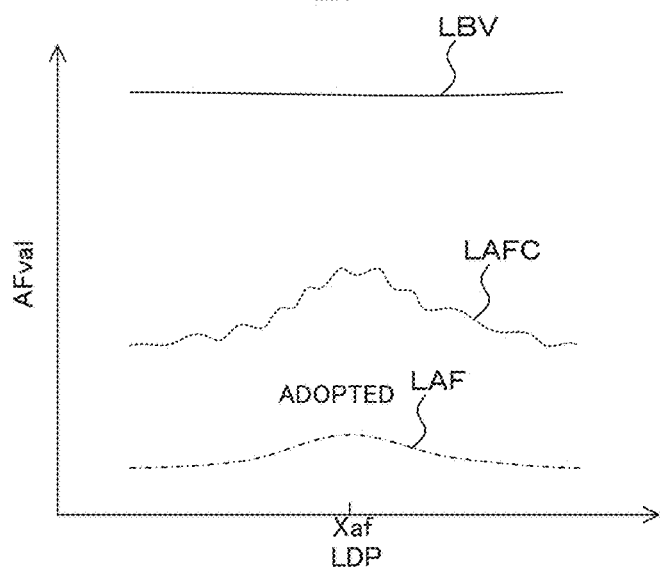
Figure 3C:
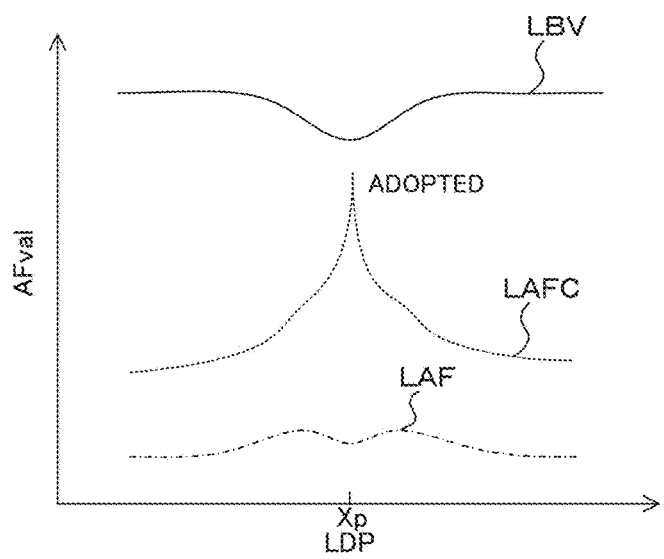

FIGS. 3B and 3C show cases where the peak position Xaf of the normal AF evaluation value curve LAF and the peak position Xp of the point light source correction AF evaluation value curve LAFC do not coincide with each other. In the case of the non-coincidence, comparison with the peak position of the brightness evaluation value curve LBV is performed and the peak position is selected depending on the result of this comparison.

FIG. 3B shows a case where the peak position Xaf of the normal AF evaluation value curve LAF and the peak position Xae of the brightness evaluation value curve LBV coincide with each other (are assumed to coincide with each other when Xaf and Xae exist within a predetermined range), or the brightness evaluation value curve LBV does not have a peak position. In this case, the peak position Xaf of the normal AF evaluation value curve LAF is selected, and this peak position Xaf is output to the AF position calculation section 11e (refer to S35 Yes to S37 in FIG. 5 to be described below). The case where the peak positions of the brightness curve LBV and the normal AF evaluation value curve LAF coincide with each other corresponds to the case where the peak AF evaluation value of the normal AF evaluation value curve LAF does not cave in even for the point light source. In this case, the peak position of the normal AF evaluation value curve LAF has a higher reliability than the peak position of the point light source correction AF evaluation value curve LAFC. Further, when the brightness curve LBV does not have a peak position, the subject is supposed to be a non-point light source and therefore the normal AF evaluation value curve LAF has a higher reliability.

FIG. 3C shows a case where the peak position Xp of the point light source correction AF evaluation value curve LAFC and the peak position Xae of the brightness evaluation value curve LBV coincide with each other (coincidence includes a case where both positions are close to each other). In this case, the peak position Xp of the point light source correction AF evaluation value curve LAFC is selected and this peak position Xp is output to the AF position calculation section 11e (refer to S33 Yes to S39 in FIG. 5 to be described below). This is because, when the peak positions of the brightness curve LBV and the point light source correction AF evaluation value curve LAFC coincide with each other, the subject is a point light source and the peak position of the point light source correction AF evaluation value curve has a higher reliability than the peak position of the normal AF evaluation value curve.

Next, an AF operation in the present embodiment will be explained by the use of the flowcharts shown in FIGS. 4 and 5. This operation is executed when the CPU in the control section 11 controls each part of the camera according to a program stored in the memory. Further, this flowchart shows the flow by mainly extracting the operation of automatic focus adjustment by the contrast AF performed when the release button is half-pressed. The flow except the automatic focus adjustment operation is a flow of normal camera control and is omitted from the flow shown in FIG. 4.

Figure 4:
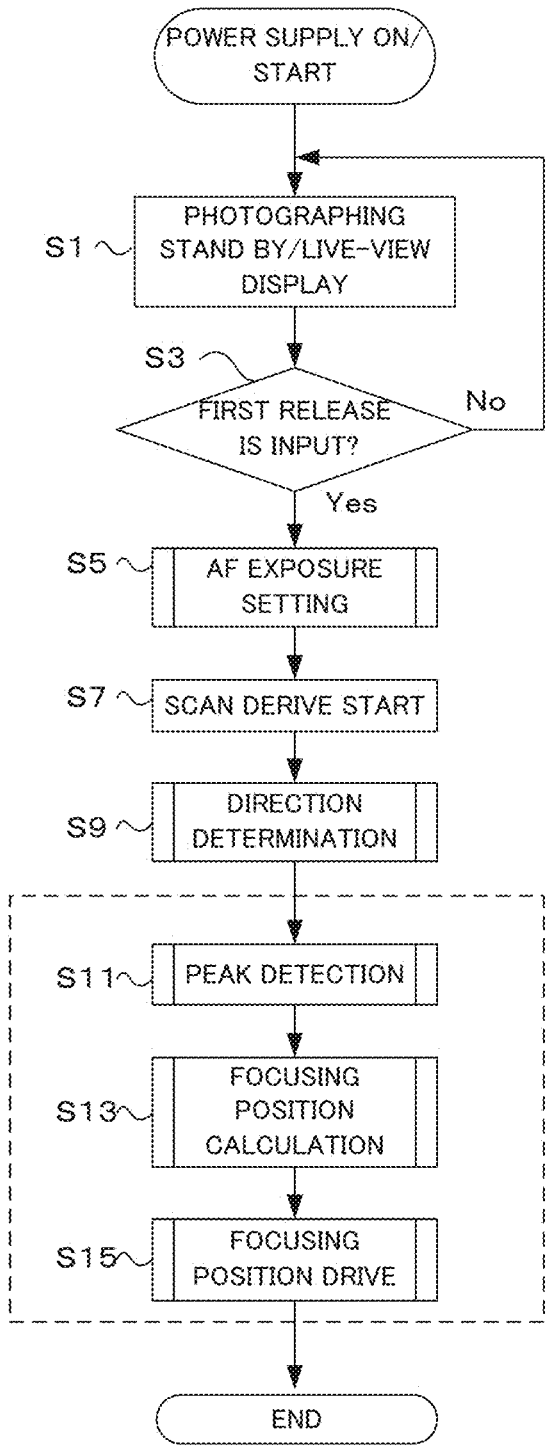
FIG. 4 is a flowchart showing a main operation of a camera according to an embodiment of the present invention.

When the power supply button of the camera is operated and the power supply is turned on, the flowchart shown in FIG. 4 starts. Upon starting, the camera enters a photographing stand-by state and performs the live-view display (S1). Here, the image processing circuit 19 performs the image processing for the live-view display using the image data acquired by the imaging section 1, and performs the live-view display on the display 25 via the display circuit 23. This live-view display updates the image every time a time corresponding to a frame rate of the image sensor 3 elapses.

Subsequently, it is determined whether first release input is performed or not (S3). Here, it is determined whether or not the release button is half-pressed and the first release switch is turned on. When the first release input does not exist as the result of this determination, the live-view display is performed and the photographing stand-by state is continued.

When the first release input exists as the result of the determination in step S3, setting for AF exposure is performed (S5). Here, the setting of an exposure control value such as an aperture value and an ISO sensitivity is performed so as to be the most suitable for the AF detection in the image data acquisition from the image sensor 3.

After the AF exposure setting, next, scan drive is started (S7). Here, the control section 11 moves the focus lens by the motor drive circuit 15 and the lens drive motor 13. In this movement, the focus lens is moved by a predetermined amount, and, every time the image data of one frame is output, the brightness evaluation value calculation section 7a acquires the brightness evaluation value, the normal AF evaluation value calculation section 9a acquires the normal AF evaluation value, and the special AF evaluation value calculation section acquires the special AF evaluation value.

When the scan drive is started, next, direction determination is performed (S9). When the focus lens is moved in a predetermined amount by the scan drive, the normal AF evaluation value acquired at this time and the normal AF evaluation value acquired when the scan is started are compared. Then, it is determined whether the current normal AF evaluation value increases or decreases from the AF evaluation value at the time of scan start by an amount not smaller than a predetermined value, using the comparison result. When the normal AF evaluation value increases as the result of this determination, the drive direction is maintained, and, when the normal AF evaluation value decreases, the drive direction is inverted.

After the direction determination, next, the peak detection is performed (S11). Here, the brightness evaluation value peak position detection section 11a detects the brightness evaluation value peak position Xae, the normal AF evaluation value peak position detection section 11c detects the normal AF evaluation value peak position Xaf, and the special AF evaluation value peak position detection section 11b detects the special AF evaluation value peak position Xp. Here, when the peak position is detected, this peak position is stored and also the peak value is detected and stored.

Subsequently, the focusing position calculation is performed (S13). Here, the peak position determination section 11d selects the peak position depending on the determination explained by the use of FIGS. 3A to 3C, using the peak positions detected in step S11. The AF position calculation section 11e calculates the AF position using this selected peak position.

After the calculation of the focusing position, next, the focus lens is driven to the focusing position (S15). Here, the control section 11 controls the motor drive circuit 15 and the lens drive motor 13 so as to move the focus lens to the focusing position calculated in step S13. After the drive to the focusing position, this flow is terminated. Detailed operation in steps S11 to S15 will be described below by the use of FIG. 5. Here, even after the focusing drive termination, if the power supply is turned on, the flow returns to step S1 and the camera control is performed.

Next, the operation from the peak detection to the focusing position drive in steps S11 to S15 will be explained by the use of the flowchart shown in FIG. 5.

Entering the flow shown in FIG. 5, the normal AF evaluation value and the point light source correction AF evaluation value are acquired in the focus detection region every time the image data of one frame is output from the imaging signal processing circuit 5 (S21). Here, the normal AF evaluation value calculation section 9a and special AF evaluation value calculation section 9b in the AF evaluation value calculation circuit 9 acquire the normal AF evaluation value and the point light source correction AF evaluation value, respectively, using the image data from the imaging signal processing circuit 5.

When the normal AF evaluation value and the point light source correction AF evaluation value are acquired, next, the normal AF evaluation value peak detection is performed (S23). Here, the normal AF evaluation value peak position detection section 11c in the control section 11 detects the peak position Xaf of the normal AF evaluation value using the normal AF evaluation value acquired in step S21. In the detection of this peak position Xaf, the maximum value of the normal AF evaluation value output from the normal AF evaluation value calculation section 9a is stored and the peak detection is completed when the current normal AF evaluation value decreases from the maximum value of the normal AF evaluation value by an amount not smaller than a predetermined value. At this time, the peak position Xaf becomes the maximum value position of the normal AF evaluation value used in the above comparison.

After the normal AF evaluation value peak detection, next, the point light source correction AF evaluation value peak detection is performed (S25). Here, the special AF evaluation value peak position detection section 11b in the control section 11 detects the peak position Xp of the point light source correction AF evaluation value using the point light source correction AF evaluation value acquired in step S21. In the detection of this peak position Xp, the maximum value of the point light source correction AF evaluation value output from the special AF evaluation value calculation section 9b is stored, and, when the current point light source AF evaluation value decreases from the maximum value of the point light source AF evaluation value by an amount not smaller than a predetermined value, the peak detection is completed. At this time, the peak position Xp becomes the maximum value position of the point light source AF evaluation value used in the above comparison.

Note that the point light source correction AF evaluation value AFval is calculated by following formula (1).

$$AFval = (AEvalStd/AEval)^n \times AFvalOrg \tag{1}$$

Here, AEvalStd is a standard brightness evaluation value, and a value larger than a range which the brightness evaluation value AEval can take is set in advance. Further, the brightness evaluation value AEval is a brightness evaluation value calculated by the AE evaluation value calculation circuit 7. As described above, this brightness evaluation value is a value corresponding to a subject brightness calculated by the use of the image data in approximately the same region as the detection region for the contrast AF focus detection. Further, AFvalOrg is a normal AF evaluation value before the correction. × expresses multiplication and n is preliminarily set optionally as a design value.

After the point light source correction AF evaluation peak detection, next, the brightness peak detection is performed (S27). Here, the brightness evaluation value peak position detection section 11a in the control section 11 detects the brightness evaluation value peak position Xae using the brightness evaluation value calculated by the brightness evaluation value calculation section 7a. In the detection of this peak position Xae, the minimum value of the brightness evaluation value output from the brightness evaluation value calculation section 7a is stored, and, when the current brightness evaluation value increases from the minimum value of the brightness evaluation value by an amount larger than a predetermined value, the minimum value detection is completed. At this time, the minimum value position Xae becomes the minimum value position of the brightness evaluation value used in the above comparison.

After the brightness peak detection, next, it is determined whether or not the point light source peak detection is completed (S29). Here, it is determined whether or not the peak position of the point light source correction AF evaluation value is detected in step S25. When the point light source peak detection is not completed as the result of this determination, the flow returns to step S21 and the above operation is repeated.

On the other hand, when the point light source peak detection is completed as the result of the determination in step S29, next, it is determined whether or not the normal AF evaluation value peak position Xaf and the point light source correction AF evaluation value peak position Xp coincide with each other (S31) Here, it is determined whether or not the normal AF evaluation value peak position Xaf detected in step S23 and the point light source correction AF evaluation value peak position Xp detected in step S25 coincide with each other.

When the peak positions do not coincide with each other as the result of the determination in step S31, it is determined whether or not the point light source correction AF peak position and the position of the the brightness minimum value coincide with each other (S33). Here, it is determined whether or not the point light source correction AF evaluation value peak position Xp detected in step S25 and the brightness evaluation value peak position Xae detected in step S27 coincide with each other.

When the peak positions coincide with each other as the result of the determination in step S33, the focusing position calculation is performed by the use of the three points near the point light source correction peak position (S39). The case where the determination in step S31 is No and the determination in step S33 is Yes corresponds to the situation explained in FIG. 3C, that is, the case where the peak position Xae of the brightness evaluation value and the peak position Xp of the point light source correction AF evaluation value coincide with each other. In this case, since the peak position Xp based on the point light source correction AF evaluation value has a high reliability, the focusing position calculation is performed using three focus positions near this peak position (the calculation is performed in step S41).

When the peak positions do not coincide with each other as the result of the determination in step S33, it is determined whether or not the detection of the normal AF evaluation value peak position is completed (S35). Here, it is determined whether or not the normal AF evaluation value peak position Xaf is detected in step S23. When the detection of the normal AF evaluation value peak position Xaf is not completed as the result of this determination, the flow returns to step S21 and the above operation is repeated.

When the peak positions coincide with each other as the result of the determination in step S31, or when the detection of the normal AF evaluation value peak position is completed as the result of the determination in step S35, the focusing position calculation is performed using three points near the normal peak position (S37). The case where the determination in step S31 is Yes corresponds to the situation explained in FIG. 3A, that is, the case where the normal AF evaluation value peak position Xaf and the point light source correction AF evaluation value peak position Xp coincide with each other. In this case, since the peak position Xaf based on the normal AF evaluation value has a higher reliability, the focusing position calculation is performed using three focus positions near this peak position Xaf (the calculation is performed in step S41).

Further, the case where the result of the determination in step S35 is Yes corresponds to the situation explained in FIG. 3B, that is, the case where the peak position Xp of the point light source correction AF evaluation value and the peak position Xae of the brightness evaluation value do not coincide with each other (including the case where the peak position of the brightness evaluation value cannot be detected). In this case also, since the peak position Xaf based on the normal AF evaluation value has a higher reliability, the focusing position calculation is performed using three focus positions near this peak position Xaf (the calculation is performed in step S41).

After the three focus positions to be used for the focusing position calculation are selected in step S37 or S39, next, the focusing position calculation is performed (S41). Here, the focusing position is calculated by the interpolation calculation or the like using the three focus positions selected in step S37 or S39.

After the focusing position calculation, next, the focusing position drive is performed (S43). Here, the control section 11 performs the drive control of the focus lens in the photographing lens 1 toward the focusing position (focus position) calculated in step S41 via the motor drive circuit 15 and the lens drive motor 13.

In this manner, in the flow of FIG. 5, the peak position of the brightness evaluation value, the peak position of the normal AF evaluation value, and the peak position of the point light source correction AF evaluation value are compared (S31 and S33), either of the peak position of the normal AF evaluation value and the peak position of the point light source correction AF evaluation value is selected using this comparison result (S37 and S39), the focusing position is calculated by the use of this selected peak position (S41), and the focus lens is driven to the focusing position (S43). Accordingly, without depending on whether the subject is a point light source or a non-point light source, it is possible to drive the focus lens to an appropriate focusing position.

Next, by the use of FIGS. 6A to 8D, the focus detection in the emission and non-emission of the AF auxiliary light in the present embodiment will be explained in comparison with that in the focus detection apparatus disclosed in Patent Literature 1.

Figure 6A:
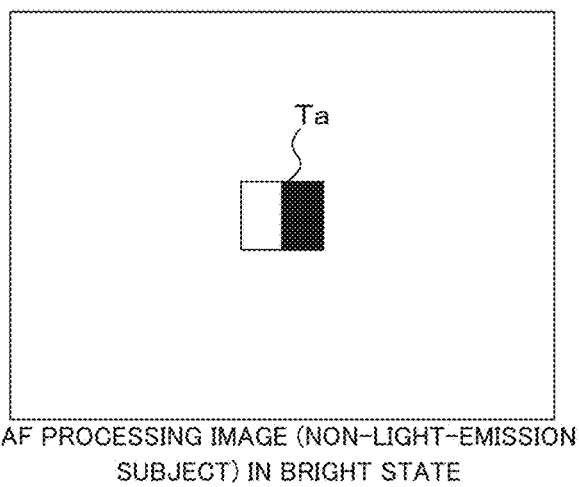
FIGS. 6A to 6D are graphs explaining a focus detection operation when auxiliary light is not emitted in a camera according to an embodiment of the present invention.
Figure 6B:
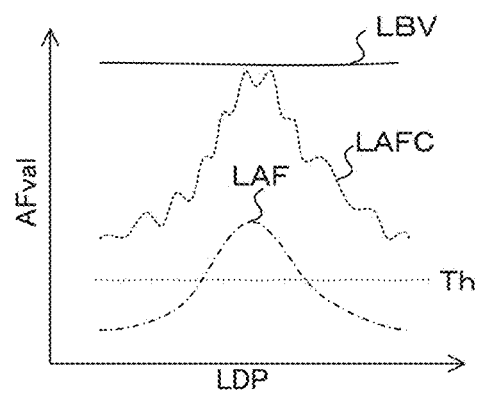

FIGS. 6A to 6D show the case where field brightness is high and the AF auxiliary light is not emitted. Further, FIGS. 7A to 7D show the case where the field brightness is low and the AF auxiliary light is not emitted. Each of FIGS. 6A and 7A shows an AF processing image, and Ta in the drawing indicates a detection target. Further, each of FIGS. 6B and 7B shows the brightness evaluation value curve LBV, the point light source correction AF evaluation value curve LAFC, and the normal AF evaluation value curve LAF which are acquired in the scan drive of the focus lens in the non-emission of the AF auxiliary light, and also shows the threshold value Th. Here, the threshold value Th corresponds to the threshold value Th10 or Th20 for the point light source determination shown in FIGS. 9A and 10A.

Figure 6C:
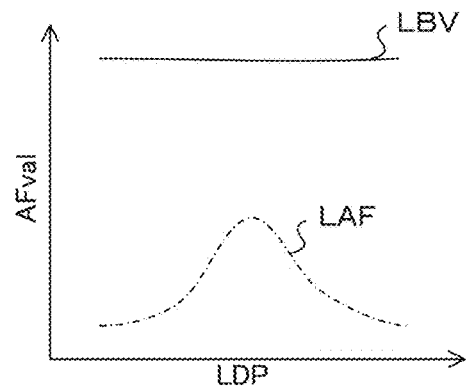
Figure 7A:
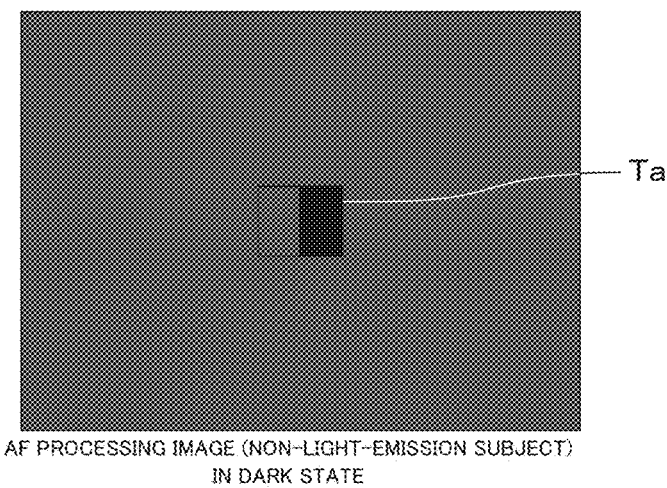
FIGS. 7A to 7D are graphs explaining a focus detection operation when auxiliary light is not emitted in a camera according to an embodiment of the present invention.
Figure 7B:
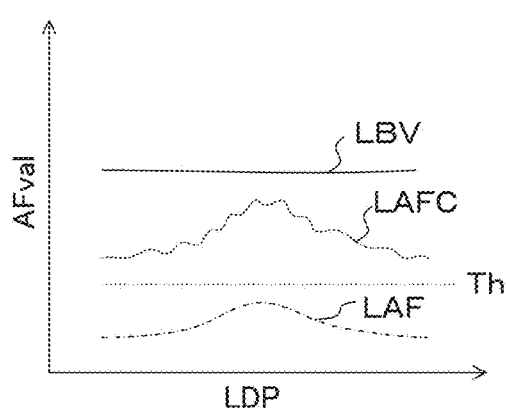
Figure 7C:
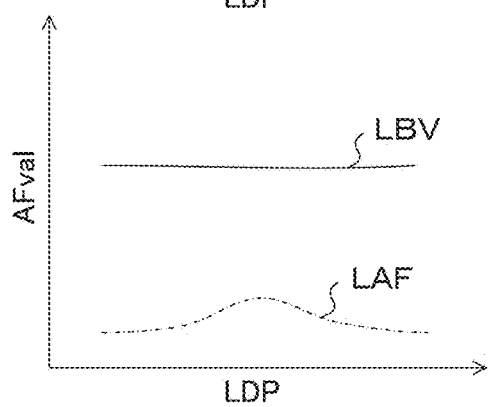

FIGS. 6C and 7C show the case where the focus detection is performed in the focus detection apparatus disclosed in Patent Literature 1. In the case of FIG. 6C, the field brightness is high and the point light source correction AF evaluation value is not obtained. Further, in the case of FIG. 7C, since the normal AF evaluation value peak value is smaller than the threshold value Th, the point light source AF evaluation value is not obtained and the peak value and the peak position of the normal AF evaluation value are obtained, and the focusing position is calculated therefrom.

Figure 6D:
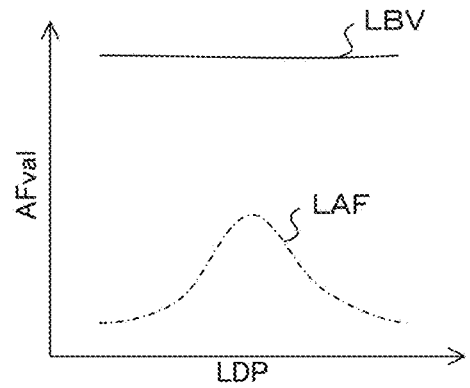
Figure 7D:
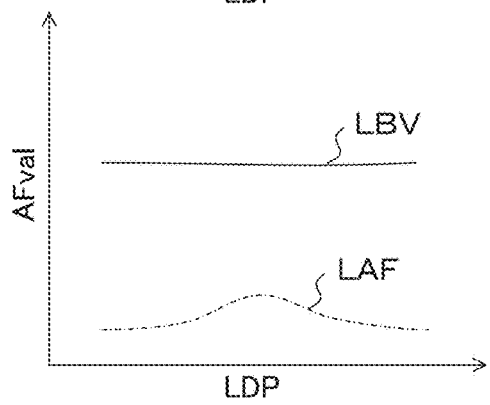

FIGS. 6D and 7D show the focus detection in the present embodiment. In this case, since the peak position of the normal AF evaluation value and the peak position of the point light source correction AF evaluation value are approximately the same (refer to FIG. 3A, and S31 Yes and S37 in FIG. 5), the focusing position is calculated by the use of the peak value and the peak position of the normal AF evaluation value.

In this manner, when the AF auxiliary light is not emitted as shown in FIGS. 6A and 7A, both of the focus detection apparatus disclosed in Patent Literature 1 and the present embodiment calculate the focusing position using the normal AF evaluation value.

Figure 8A:
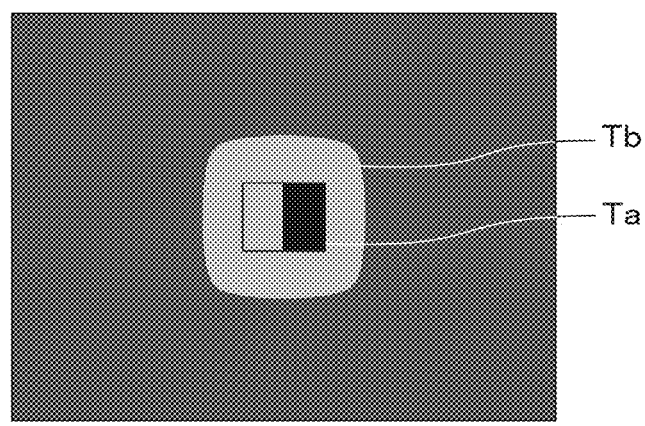
FIGS. 8A to 8D are graphs explaining a focus detection operation when auxiliary light is emitted in a camera according to an embodiment of the present invention.
Figure 8B:
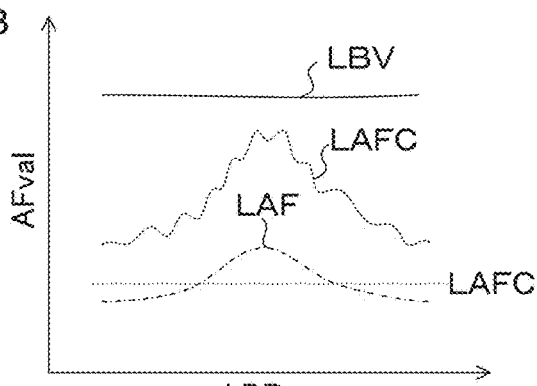

FIGS. 8A to 8D show the case where the field brightness is low and the AF auxiliary light is emitted. FIG. 8A shows an AF processing image, and Ta in the drawing indicates a detection target and Tb indicates an emission range of the AF auxiliary light. Further, FIG. 8B shows the brightness evaluation value curve LBV, the point light source correction AF evaluation value curve LAFC, and the normal AF evaluation value curve LAF which are acquired in the scan drive of the focus lens in the non-emission of the AF auxiliary light, and also shows the threshold value Th. Here, the threshold value Th corresponds to the threshold value Th10 or Th20 for the point light source determination shown in FIGS. 9A and 10A.

Figure 8C:
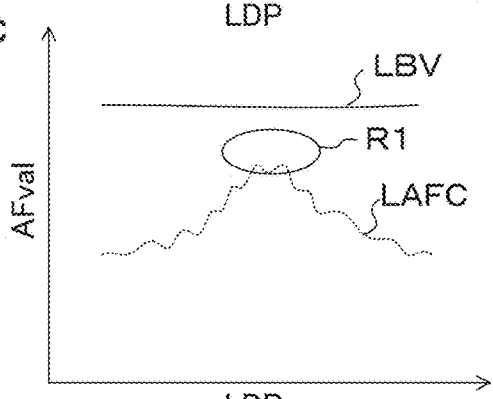

FIG. 8C shows the case where the focus detection is performed by the focus detection apparatus disclosed in Patent Literature 1. In the case of FIG. 8C, since the peak value of the normal AF evaluation value is larger than the threshold value Th, the point light source AF evaluation value is obtained, the peak value and the peak position of this point light source correction AF evaluation value are obtained, and the focusing position is calculated therefrom. In this case, the value around the peak value R1 in the point light source correction AF evaluation value varies irregularly and therefore the focusing accuracy deteriorates.

Figure 8D:
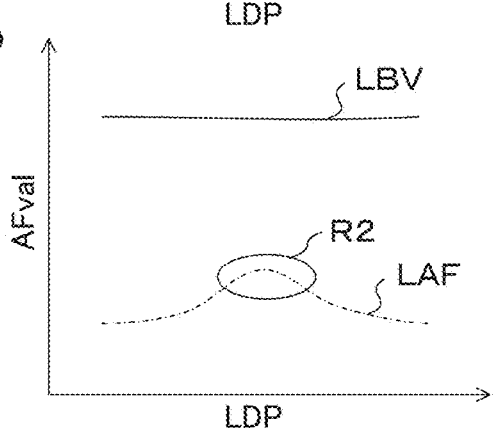

FIG. 8D shows the focus detection in the present embodiment. In this case, since the peak position of the normal AF evaluation value and the peak position of the point light source correction AF evaluation value are approximately the same (refer to FIG. 3A, and S31 Yes and S37 in FIG. 5), the focusing position is calculated using the peak value and the peak position of the normal AF evaluation value. The value around the peak value R2 of the normal AF evaluation value varies smoothly, and therefore the focusing accuracy is high.

When the AF auxiliary light is emitted as shown in FIG. 8A, the focus detection apparatus disclosed in Patent Literature 1 calculates the focusing position using the point light source correction AF evaluation value, and, in this case, the focusing accuracy deteriorates. The present embodiment, however, calculates the focusing position using the normal AF evaluation value as shown in FIG. 8C, and it is possible to improve the focusing accuracy.

As explained above, in an embodiment of the present invention, the brightness evaluation value, the normal AF evaluation value, and the special AF evaluation value are acquired at different focus positions, and the peak position is acquired for each of the evaluation values (refer to S21 to S27 in FIG. 5). Then, the peak position of the brightness evaluation value, the peak position of the normal AF evaluation value, and the peak position of the special AF evaluation value are compared (refer to S31 and S33 in FIG. 5), the information to be used for the focus detection is selected using this comparison result, and the focus position is obtained using the peak position and peak value of this selected information (refer to S37, S39, and S41 in FIG. 5). Accordingly, without depending on whether the subject is a point light source or a non-point light source, it is possible to perform focusing to an appropriate focusing position.

Note that, in an embodiment of the present invention, the point light source correction AF evaluation value as shown in formula (1) is used as the special AF evaluation value. Not limited to this formula, however, any calculation formula to correct the influence of the point light source may be used. For example, the AF evaluation value may be corrected by the combination of various kinds of information such as brightness information, contrast information at different frequencies, and color information. Further, for the peak value and the peak position of the AF evaluation value, an extreme value and the position of the extreme value of the AF evaluation value may be used not limited thereto.

Further, while the AE evaluation value calculation circuit 7 and the AF evaluation value calculation circuit 9 are assumed to be constituents separated from the control section 11 in each of the embodiments of the present invention, obviously a part or the whole thereof may be configured with software and executed by the CPU in the control section 11. Moreover, each of the AE evaluation value calculation circuit 7, the AF evaluation value calculation circuit 9, and the image processing circuit 19 may be a hardware constituent such as a gate circuit generated by a program language described by Verilog, or a hardware constituent utilizing software such as DSP (Digital Signal Processor). Obviously these may be combined optionally.

Further, while the present embodiment is explained by the use of the digital camera as a photographing device, the camera may be a digital single reflex camera, a compact digital camera, a moving picture camera such as a video camera and a movie camera, and further a camera built in a mobile phone, a smart phone, a mobile information terminal (PDA: Personal Digital Assist), a personal computer (PC), a tablet type computer, a game machine, or the like. The present invention can be applied to any device if the device performs the focus adjustment of the focus lens by the contrast AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus detection apparatus, comprising:
an imaging section which acquires image data;
a brightness information acquiring section which acquires brightness information at different focus positions and detects a peak position of a brightness evaluation value;
a normal focus detection information acquiring section which calculates contrast information using the image data at different focus positions and detects a peak position of a normal AF evaluation value from this contrast information;

a special focus detection information acquiring section which detects a peak position of a special AF evaluation value among different focus positions using the brightness information acquired by the brightness information acquiring section and the contrast information calculated by the normal focus detection information acquiring section;

a determination section to determine information for focus detection using the brightness information and at least either of the peak position of the normal AF evaluation value detected by the normal focus detection information acquiring section and the peak position of the special AF evaluation value detected by the special focus detection information acquiring section; and a focus detection calculation section which calculates a focus detection position using the information for focus detection determined by the determination section.

2. The focus detection apparatus according to claim 1, wherein
the determination section determines whether or not the peak position in the brightness information at different focus positions and the peak position of the normal AF evaluation value or the peak position of the special AF evaluation value exist within a predetermined distance.

3. The focus detection apparatus according to claim 2, wherein
the focus detection calculation section selects the peak position of the special AF evaluation value as a position for focus detection calculation when the peak positions are determined to exist within the predetermined distance by the determination section, and uses the peak position of the normal AF evaluation value for the focus detection calculation when the peak positions are determined not to exist within the predetermined distance by the determination section.

4. The focus detection apparatus according to claim 1, wherein
the determination section determines whether or not the peak position of the special AF evaluation value and the peak position of the normal AF evaluation value or the peak position of the brightness evaluation value exist within a predetermined distance.

5. The focus detection apparatus according to claim 4, wherein
the focus detection calculation section selects the peak position of the special AF evaluation value as the position for focus detection calculation when the the peak positions are determined to exist within the predetermined distance by the determination section, and uses the peak position of the normal AF evaluation value for the focus detection calculation when the peak positions are determined not to exist within the predetermined distance by the determination section.

6. The focus detection apparatus according to claim 1, wherein
the brightness information in the brightness information acquiring section is at least any one of a brightness value in a predetermined region, the number of saturated output regions, and presence or absence of a brightness difference in divided regions.

7. A focus detection method, comprising:
acquiring image data;
acquiring brightness information at different focus positions using the image data, and detecting a peak position of a brightness evaluation value;
calculating contrast information using the image data at different focus positions and detecting a peak position of a normal AF evaluation value from this contrast information;
detecting a peak position of a special AF evaluation value at different focus positions using the brightness information and the contrast information;
determining information for focus detection using the brightness information and at least either of the peak position of the normal AF evaluation value and the peak position of the special AF evaluation value; and
calculating a focus detection position using the determined information for focus detection.

8. A non-transitory computer-readable medium storing a computer program for controlling a computing device, the computer program including instructions causing the computing device to perform a method comprising:
acquiring image data;
acquiring brightness information at different focus positions using the image data, and detecting a peak position of a brightness evaluation value;
calculating contrast information using the image data at different focus positions and detecting a peak position of a normal AF evaluation value from this contrast information;
detecting a peak position of a special AF evaluation value at different focus positions using the brightness information and the contrast information;
determining information for focus detection using the brightness information and at least either of the peak position of the normal AF evaluation value and the peak position of the special AF evaluation value; and
calculating a focus detection position using the determined information for focus detection.

* * * * *